US012560924B2

(12) United States Patent
Hesse

(10) Patent No.: US 12,560,924 B2
(45) Date of Patent: Feb. 24, 2026

(54) ANALYZING OPERATIONAL EVENTS OCCURRING DURING OPERATION OF A TECHNICAL INSTALLATION

(71) Applicant: Lenze SE, Aerzen (DE)

(72) Inventor: Peter Hesse, Hameln (DE)

(73) Assignee: Lenze SE, Aerzen (DE)

( * ) Notice: Subject to any disclaimer, the term of this patent is extended or adjusted under 35 U.S.C. 154(b) by 493 days.

(21) Appl. No.: 18/104,317

(22) Filed: Feb. 1, 2023

(65) Prior Publication Data

US 2023/0281098 A1     Sep. 7, 2023

(30) Foreign Application Priority Data

Feb. 3, 2022     (DE) ............................ 102022102619

(51) Int. Cl.
| | |
|---|---|
| *G05B 23/02* | (2006.01) |
| *G06F 11/07* | (2006.01) |
| *G06F 11/30* | (2006.01) |
| *G06F 21/55* | (2013.01) |
| *G06F 21/64* | (2013.01) |

(52) U.S. Cl.
CPC ...... *G05B 23/0275* (2013.01); *G06F 11/0736* (2013.01); *G06F 11/0751* (2013.01);
(Continued)

(58) Field of Classification Search
CPC ............. G06F 11/0736; G06F 11/0751; G06F 11/079; G06F 11/0796; G06F 11/22;
(Continued)

(56) References Cited

U.S. PATENT DOCUMENTS

| | | | |
|---|---|---|---|
| 2005/0080806 A1* | 4/2005 | Doganata | ............ G06F 11/2257 |
| | | | 707/999.102 |
| 2011/0225142 A1* | 9/2011 | McDonald | ............ G06F 21/552 |
| | | | 707/E17.108 |

(Continued)

FOREIGN PATENT DOCUMENTS

| | | | | |
|---|---|---|---|---|
| DE | 10 2017 116 167 A1 | 1/2019 | | |
| DE | 112017007877 T5 * | 5/2020 | ............ | G06F 21/64 |

(Continued)

OTHER PUBLICATIONS

Ahmed, Irfan, et al., Programmable Logic Controller Forensics, IEEE Security & Privacy, Nov. 2017, 7 pages, [retrieved on Nov. 7, 2025], Retrieved from the Internet: <URL:http://ieeexplore.ieee.org/>.*

(Continued)

*Primary Examiner* — Geoffrey R St Leger
(74) *Attorney, Agent, or Firm* — Westborough IP Group, LLC

(57)     ABSTRACT
The system described herein relates to analyzing operation events during operation of a technical device, in particular of a machine or installation, where the technical device includes at least one automation device, such as a programmable logic controller. The automation device is enabled to execute automation technology tasks using automation software that is executable by the automation device. Analysis software extracts data from operation data obtained using sensors in the physical world, from the automation software and/or from data traffic of the automation device and conditions the data, where the conditioning includes storing the extracted data in a database, such as a relational database, and the data stored in the database are evaluated with regard to the operation event by the analysis software.

24 Claims, 1 Drawing Sheet

(52) U.S. Cl.
    CPC ........ *G06F 11/079* (2013.01); *G06F 11/3058*
        (2013.01); *G06F 21/552* (2013.01); *G06F*
        *21/554* (2013.01); *G06F 21/64* (2013.01);
        *G06F 11/0796* (2013.01); *G06F 2221/033*
        (2013.01)

(58) Field of Classification Search
    CPC ............. G06F 11/3409; G06F 11/3508; G06F
        21/554; G06F 2221/033; G06F 1/30;
        G06F 21/64; G06F 21/552; G06F 21/566;
        G05B 23/0275
    See application file for complete search history.

(56)                    References Cited

U.S. PATENT DOCUMENTS

| | | | |
|---|---|---|---|
| 2016/0148111 A1* | 5/2016 | Miyata | G06F 11/079 |
| | | | 706/48 |
| 2017/0102696 A1* | 4/2017 | Bell | G05B 23/0275 |
| 2019/0138713 A1 | 5/2019 | Fusenig et al. | |
| 2020/0209828 A1 | 7/2020 | Altendorf | |
| 2021/0149909 A1* | 5/2021 | Diaz | G01D 9/005 |

FOREIGN PATENT DOCUMENTS

| | | | |
|---|---|---|---|
| EP | 3 239 883 A1 | 11/2017 | |
| WO | WO-2016101005 A1 * | 6/2016 | G06Q 50/18 |

OTHER PUBLICATIONS

Hadiosmanović, Dina, et al., Through the Eye of the PLC: Semantic Security Monitoring for Industrial Processes, ACSAC '14: Proceedings of the 30th Annual Computer Security, Dec. 2014, 10 pages, [retrieved on Nov. 7, 2025], Retrieved from the Internet: <URL:http://dl.acm.org/>.*

* cited by examiner

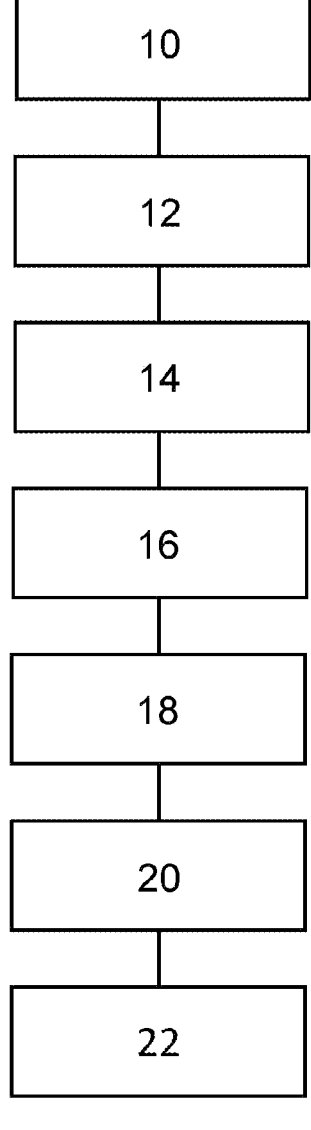

ANALYZING OPERATIONAL EVENTS OCCURRING DURING OPERATION OF A TECHNICAL INSTALLATION

TECHNICAL FIELD

The system described herein relates to analyzing operation events during operation of a technical device and more particularly to analyzing operation events during operation of a machine and/or an installation that is, for example, part of a production process where the technical device may be part of an infrastructure or be incorporated in other processes, for example, in the field of disposal or logistics.

BACKGROUND

Technical devices may include at least one automation device that serves to automate other devices, such as machines and/or installations. The degree of automation may range from individual open-loop and/or closed-loop control technology tasks, such as ensuring a constant rotational speed of a drive, for example, up to highly complex automation tasks which involve controlling, for example, entire production lines with a plurality of machines and/or installations connected in terms of process engineering.

The high potential currently afforded by automation technology is made possible in particular by virtue of contemporary automation devices being enabled to execute automation technology tasks by way of automation software. This is the case for example for automation devices in the form of programmable logic controllers, which are now also referred to as "Programmable Automation Controller (PAC)", particularly if the programmable logic controllers can execute complex automation tasks, as in the case of process control systems.

Through the use of software executed by the automation device instead of the earlier electronic automation devices, the functionality of which was predefined by, generally invariable, circuitry interconnection of electronic components, the automation devices based on the use of executable automation software can adapt significantly better to different automation tasks. In practice, as a result, the automation devices based on the use of executable automation software also make it possible to manage significantly more complex automation tasks.

In the course of this, it is quite understandable that the increasing complexity of the requirements and possibilities in the field of automation technology necessitates ever more complex automation software of the automation devices. In this case, the respective software contains a plurality of parts specific to a particular type of automation device, or technical device, which the automation device is part of, or even to a particular use of a specific automation device or of the corresponding technical device.

As a result of the high degree of complexity, however, in the case of operation events during operation of the technical device, the search for a cause of an operation event has become significantly more complex. This is the case particularly if the causes of an operation event reside in an area of the automation device and in particular in the area of the automation software. Aspects from the area of the physical world and aspects from the area of electronic data processing often play a part in such operation events. Examples of such operation events are, for example, a sudden fluctuation in product quality which does not have a recognizable cause in the physical parts of a machine, but rather is attributable to problems in the execution of the automation software, or the recognition of a hacker attack which lacks clarity regarding the effects that the attack will possibly have on the physical behavior of a technical device in the production environment thereof. An added difficulty in the case of such operation events is that deepening technical knowledge is required in different fields, namely in that of information technology and that of machine or installation technology. The analysis of such an operation event is therefore time-consuming and resource-consuming.

SUMMARY OF THE INVENTION

The system described herein analyzes an operation event which allows a rapid identification of the operation event.

The automation device may be, for example, a programmable logic controller. In principle, the system described herein is suitable for analyzing the automation software of any automation device which is enabled to execute automation technology tasks using automation software that is executable by the automation device. The automation device may also be a visualization device, such as a web panel, an IO system, a safety device, such as a safety controller or a safety IO system, a sensor and/or an actuator which has corresponding integrated automation software, such as firmware, for example, in order to execute the software independently, a computer used for automation tasks, a network device, such as a gateway, for example an edge gateway or an IoT gateway, a router or a switch, a control device, such as a programmable logic controller and/or a process control system, for example, and/or a drive controller, for example a servo controller or frequency converter.

The automation software includes both programs and data with which the programs interact. The data can be in particular data which are processed by the programs, i.e., in particular are read in, and data which are generated by the programs, i.e., stored in the data memory by the programs.

Data is extracted and conditioned by analysis software. In this case, the data are extracted from operation data obtained using sensors in the physical world, from the automation software and/or from data traffic of the automation device. In this case, conditioning the extracted data includes storing the data in a database. The database can be in particular a relational database. The data stored in the database are analyzed with regard to the operation event by the analysis software.

It has been found in connection with the system described herein that having data be firstly collected and then conditioned in the context of storage in a database is suitable for carrying out a purposeful analysis of the data with regard to specific operation events which can be found only with difficulty using conventional fault-finding methods.

The system described herein can provide for the analysis software to be executed on a separate computer connected to the automation device via a data connection. This can be advantageous, for example, if the analysis involves the analysis of a possible attack, and the need for evidence preservation measures should be expected. In particular, a dedicated forensic computer can be involved in this context. A dedicated forensic computer should be understood to mean a computer which is set up in such a way that it allows analysis of data to be carried out while complying with forensic standards.

Alternatively and/or supplementarily, the analysis software can be software which is executed on the automation device or some other automation device connected to the automation device via a data connection. Such analysis software can be a service, for example. Thus, the analysis software can be executed for example as a service on a programmable logic controller, and an automation device in the form of an actuator connected to the controller via a data connection can be used for the analysis of the automation software. This has the advantage that no additional hardware components are required for carrying out the system described herein.

Alternatively and/or supplementarily, the analysis software can be executed by a cloud computing system. This has the advantage of a high degree of spatial independence; in particular, the analysis can be carried out "remotely" in the short term.

Particularly if the analysis software is executed on a cloud computing system and/or an automation device, the analysis software can be executed in a virtual environment, for example by way of container virtualization. This can be done using the "Docker" software, for example. Alternatively and/or supplementarily, it is possible to execute the analysis software on a virtual machine.

The operation data obtained using sensors in the physical world can be in particular process data relating to measured values acquired using sensors. The operation data can be, for example, actual values of a rotational speed, torque, acceleration, velocity, pressure, temperature, concentration, mixing ratio, mass flow rate and/or volumetric flow rate.

Alternatively and/or supplementarily, the operation data obtained using sensors in the physical world can be such operation data which are based on information technology processing of values measured using sensors in the physical world. In other words, the operation data can be data which are based on calculations, for example calculations carried out using the automation software of the automation system, which however have been influenced by measured values obtained using sensors in the physical world and/or by data relating to the measured values as output variables. In this regard, the operation data can be data of condition monitoring, for example, which relate to service lives of elements of the technical device that are forecast on the basis of measured values, for example. Alternatively and/or supplementarily, the operation data can be data of a predictive maintenance system, which generates dynamic maintenance plans on the basis of measured values obtained.

The automation software can be an operating system and/or a part of an operating system. The part of the operating system can be in particular a kernel or operating system kernel. Alternatively and/or supplementarily, the part of the operating system can be a library. On account of the central importance for the function of the automation device, the above elements of an operating system are particularly sensitive parts of automation software and thus are part of the implementation used in connection with analyzing the automation software.

The automation software can include a runtime environment and/or part of a runtime environment. Runtime environments serve in particular to allow the execution of programs written for the respective runtime environment. This can be, for example, a runtime environment for visualization software, in particular web-based visualization software. Runtime environments make it possible in particular to incorporate software from third-party providers in automation software. The software then only needs to conform to the requirements of the runtime environment; the third-party provider does not require deep knowledge about the automation device or the other automation software of the automation device, but rather can design the software in a suitable manner for the runtime environment. Such runtime environments are therefore likewise of central importance in automation software of the type in question and thus are part of the implementation used in connection with the system described herein.

The part of the runtime environment can be in particular a runtime library, a standard library, a programming interface and/or a runtime variable.

Alternatively and/or supplementarily, the system described herein can provide for the automation software to include configuration data. Configuration data are to be understood to mean such data which relate to technical design features of the automation device and/or of the technical device corresponding to the automation device. Using such configuration data, the automation software of the automation device is adapted to the respective automation device and/or the respective technical device corresponding to the automation device. In this case, the design features are in particular such technical design features which are identical for all automation devices and/or technical devices of a specific type. The technical design features can be in particular an axis configuration of a drive system, in particular the number of axes of a drive system, and/or the presence of an optional module of a technical device, for example the presence of an extraction device and/or a quality control device.

Alternatively and/or supplementarily, the system described herein can provide for the automation software to include parameterization data. Parameterization data are to be understood to mean such data which relate to technical parameters of the automation device and/or of the technical device which the automation device is part of. The technical parameters are parameters which are individually defined for a specific automation device and/or technical device. By way of example, the technical parameters can be individually defined in order to take account of or compensate for manufacturing tolerances during the production of the technical device. The technical parameters can therefore be in particular parameters which have been determined by measurements on the respective technical device. The technical parameters can relate in particular to dimensions, such as reference positions, stop positions, pushbutton positions and/or axis lengths, in particular of industrial robots. The automation software can include application data. In this context, application data are to be understood to mean such data which relate to the particular use of the automation device and/or of the technical device that corresponds to the automation device. This can mean in particular that the application data are dependent on the respective use of an individual technical device. For each individual technical device, the respective use can differ from other individual devices of the same type. This can involve in particular programs for operation sequences of the technical device, controller parameters, limit values, for example for permissible rotational speed, torque, acceleration, velocity and/or jerk, target values, for example for rotational speed, torque, acceleration, velocity and/or jerk, process parameters, such as temperatures, pressures, concentrations, mixing ratios, mass flow rates and/or volumetric flow rates.

The data traffic of the automation device can involve data which the automation device exchanges with other entities via data connections. This can involve data which are obtained from moved data, in particular as a result of the recording of data which are transmitted via a data connection.

Alternatively and/or supplementarily, the data traffic of the automation device can involve data which have been transmitted to the automation device via a data connection and have been stored by the automation device. This makes it possible, for example, to recognize malware transmitted to the automation device by the network, without corresponding monitoring of the data connection being necessary; by way of example, corresponding data can be recognized in the context of a virus signature check of a data memory of the automation device.

The system described herein can provide for the analysis software to include a plurality of analysis modules for analyzing operation events of specific operation event types. In this case, in particular, each analysis module is assigned to a specific operation event type. The analysis modules include in particular rules for the extraction, conditioning and/or analysis of the data.

The provision of such analysis modules as parts of the analysis software affords the advantage that the analysis software can be adapted to different types of operation events using a corresponding design of the respective analysis module. If the intention is thus to analyze an operation event of a specific type, then this can be done by using the corresponding analysis module which is assigned to the type of the operation event to be analyzed. The resulting modular set-up of the analysis software with an assignment of each analysis module to a specific operation event type allows purposeful and resource-saving use of the analysis software.

The analysis software is designed to be expandable, in particular. Alternatively and/or supplementarily, the analysis software can provide a tool for generating further analysis modules. Such a design of the analysis software allows the analysis software subsequently to be supplemented by analysis modules. This allows reaction to the possibility that in the context of increasing operational experience with a technical device, further operation event types can be identified, the analysis of which can potentially be carried out using the available analysis software, but not with the analysis modules actually present, or where carrying out the analysis yields only sub-optimum results on account of the analysis modules not being sufficiently adapted to the new operation event type.

Analysis software which is expandable by further analysis modules is to be understood to mean in particular analysis software which allows further analysis modules to be added to the analysis software, without the need to make interventions in the programming of the analysis software for this purpose. Such interventions are to be understood to mean in particular interventions in the source code of the analysis software, the source code not belonging to the individual modules. In particular, analysis software designed to be expandable is to be understood to mean analysis software which makes available a tool for inserting further analysis modules into the analysis software itself. Such analysis software can easily be expanded, without deepening knowledge, by analysis modules which can be made available for example by third parties, such as manufacturers of technical devices.

Alternatively and/or supplementarily, the analysis software can provide tools for generating further analysis modules. This can be in particular an integrated development environment for further analysis modules. Such tools enable the operator of a technical device, for example, to develop—as a reaction to new operation event types recognized in the context of operational experience—new analysis modules for these operation event types, without necessitating extensive programming knowledge with regard to the analysis software.

The rules for the extraction of the data can concern in particular the selection of the data to be extracted. Such rules for the extraction of the data make it possible in particular to extract only those data which are relevant to the respective analysis. This enables the system described herein to be carried out with more sparing use of resources.

The rules for the conditioning of the data concern in particular the structure of the database. The system described herein can provide in particular for the structure of the database to be established by the analysis software, depending on the rules of the analysis module used, in the context of the conditioning of the data. Such "dynamic" generation of the database allows a database structure that is expedient with regard to the analysis to be carried out.

The system described herein can provide for the analysis software to store a copy of the operation data obtained using sensors in the physical world, of the automation software and/or of the data traffic of the automation device in a memory area provided therefor. Advantageously, the data are extracted from the copy.

The advantage here is that no further accesses to the automation device are required for carrying out the actual analysis. The data to be analyzed only have to be read out once. A further advantage is that alterations of the operation data and/or automation software stored on the automation device cannot have any further effect on the copies once the copies have been produced.

The system described herein can provide for the access to the operation data obtained using sensors in the physical world, to the automation software and/or to the data traffic of the automation device to be effected using a write blocker. In particular, the creating of the copy can be effected using a write blocker. A write blocker is to be understood to mean hardware and/or software which ensures that the access to the medium to be read, in the present case in particular to a data memory of the automation device and/or to the data traffic, is effected purely as a read access. This ensures in particular that the automation software stored on the data memory of the automation device is not altered when the copy is produced. The same applies to operation data that can likewise be stored on a data memory of the automation device. This, on one hand, affords the advantage of thus ensuring that no possibly harmful change is brought about in the automation software stored on the data memory of the automation device. Furthermore, the fact that such a possible alteration is excluded by the write blocker is advantageous if the results of the analysis are intended to be used as evidence, for example in legal proceedings.

The system described herein can provide for the copy of the operation data obtained using sensors in the physical world, of the automation software and/or of the data traffic, the copy being stored in the memory area provided, and/or data stored in the database to be protected against changes. Alternatively and/or supplementarily, the system described herein can provide for the copy of the operation data obtained using sensors in the physical world, of the automation software and/or of the data traffic, the copy being stored in the memory area provided, and/or data stored in the database to be protected against unrecognized changes. Protection against unrecognized changes is to be understood to mean in particular that although a change of the copy and/or of the data in the database is possible, the presence of such a change can subsequently be recognized. In particular, a hash function can be used for protecting the copy and/or the data in the database against changes and/or unrecognized changes. Such a hash function or mapping function makes it possible to calculate hash values with respect to the copies stored in the memory area provided. In this case, it is not possible, or it is at least virtually impossible in practice, to deduce from the hash values the data underlying the hash values. Such hash functions are also referred to as crypto-logical hash functions or cryptographic hash functions. An alteration of the stored copy and/or of the data in the database can easily be recognized in this way since the data which form the copy or are stored in the database no longer "match" the corresponding hash values if the copy is altered. The question whether the data have been altered can then be checked in a simple manner by the hash value being calculated again for the data and being compared with the stored hash value.

Alternatively and/or supplementarily, the copy stored in the memory area provided and/or the data in the database can be protected against changes and/or unrecognized changes using an authentication feature. Such an authentication feature makes it possible in particular to recognize the cause of a change. In particular, the authentication feature makes it possible to recognize the analysis software as the cause of a change to the copy and/or to the data in the database. This makes it possible to ensure that the data stored in the copy and/or the database have actually been stored by the analysis software.

The authentication feature can be for example a certificate according to the X.509 standard. Such a certificate can be used for example as a key in order to sign the copy and/or the data stored in the database. Such signing makes it possible to check whether the copy and/or the data in the database have/has been created by the certificate owner. The certificate owner is in this case the user of the analysis software, in particular.

Alternatively and/or supplementarily, the copy and/or the data in the database can be stored in an encrypted manner. The advantage is that encrypted data cannot be deliberately manipulated since they are not readable without prior decryption. A certificate, for example a certificate according to the X.509 standard, can likewise be used as a key for the encryption.

The system described herein can provide that, with respect to data stored in the database, information is stored which indicates the extent to which the respective data correspond to forensic requirements. In this context, the system described herein can provide in particular for data in the database to be marked with a flag depending on whether the data correspond to forensic requirements.

Data which correspond to forensic requirements are to be understood to mean in particular data which have been collected using a write blocker and/or as forensic duplicates. Alternatively and/or supplementarily, all processing steps to which the data are subject in the context of carrying out the system described herein must be traceable and/or repeatable, wherein in particular the mechanisms used for processing must be disclosed.

The copy can be a forensic duplicate of a data carrier and/or main memory of the automation device and/or of a data packet from the data traffic of the automation device. A forensic duplicate is an unaltered physical one-to-one copy of the corresponding data packet, data carrier and/or main memory. A copy which satisfies this requirement is advantageous particularly if the copy is intended to be used in the context of presentation of evidence, for example in the context of legal proceedings. In this case, the forensic duplicate can be in particular the forensic duplicate of a hard disk of the automation device and/or of a memory card accommodated in the automation device. A further advantage of such a forensic duplicate is that the latter can be reconstructed and analyzed by being transferred into a virtual environment.

The system described herein can provide for an automated triggering of the analysis of the operation event to be effected upon the occurrence of a triggering operation event of a specific operation event type. In this context, the system described herein can provide in particular monitoring with regard to the occurrence of an operation event of this specific operation event type. In this way, event-controlled analyses of operation events can be realized using the system described herein. Alternatively and/or supplementarily, however, it is also possible to provide manual analyses and/or analyses triggered in a different automated manner. A different automated triggering can be realized for example by the automated triggering of the analysis after specific time intervals have elapsed.

The analysis triggered by the occurrence of the triggering operation event is effected in particular using an analysis module which is assigned to the operation event type of the triggering operation event. In this context, it is possible to carry out monitoring for the occurrence of operation events of different operation event types, to each of which at least one corresponding analysis module is assigned. Moreover, it is conceivable that, for the individual analysis modules, it is possible to stipulate individually whether the analysis defined by the respective analysis module is triggered manually and/or in a different automated manner upon the occurrence of a specific operation event type.

The operation event type of the triggering operation event can be the recognition of a security-relevant event by an information technology security system, in particular a firewall, an intrusion detection system and/or a virus scanner.

In this context, a firewall is to be understood to mean hardware and/or software which checks and in particular regulates the data connections of the automation device. A virus scanner checks files stored in data memories of the automation device. The virus scanner can, in particular, transfer into quarantine and/or erase files which are recognized as harmful and/or potentially harmful by the virus scanner. An intrusion detection system can be designed to check data, in particular data transmitted via data connections, with regard to content of the data connections. In particular, it is possible to check whether contents known to be harmful are included, or contents which should be classified as potentially harmful on account of properties of the contents, such as emails from fake senders, for example. Such checks are also referred to as signature-based checks. Alternatively and/or supplementarily, the intrusion detection system can be designed to carry out a check for unusual events, for example whether a user at a corresponding interface logs on at the automation device via a data connection in quick succession from locations that are geographically far apart from one another, for example firstly from Germany and then from a geographically distant foreign country within a few minutes.

The recognition of such a security-relevant event as an operation event can be an indication of a jeopardization of the operation of the technical device or of the technical device itself. The system described herein allows such an operation event to be recognized and analyzed in a simple and rapid manner.

Alternatively and/or supplementarily, the operation event type of the triggering operation event can be the recognition of a disturbance of routine operation using sensors in the physical world and/or on the basis of operation data obtained using to sensors in the physical world. The starting point of such an analysis is an event in the physical world which is recognized using sensors which are in particular part of an automation system that includes the automation device. Alternatively and/or supplementarily, the operation event can also be recognized on the basis of operation data obtained using such sensors. By way of example, the automation device can recognize that limit values have been exceeded on the basis of operation data which the automation device receives via a network connection, such as a fieldbus.

Alternatively and/or supplementarily, the operation data on the basis of which the disturbance is recognized can be operation data which have been generated using the information technology processing of operation data obtained using sensors in the physical world. In this regard, it is conceivable, for example, for the forecast service life of a component of the technical device to abruptly decrease in corresponding operation data. Such an operation event can serve as a trigger for carrying out an analysis according to the system described herein. Such operation data can be data from a condition monitoring system. Such an operation event can be for example an indication of a directly imminent failure of the component. The system described herein can then provide for example for interrupting the operation of the technical device before the occurrence of an actual failure of the component, which is possibly associated with danger for humans and material.

The analysis of the automation software and/or of the data traffic is effected in particular with regard to an information technology cause of the disturbance. In this case, the information technology cause can be an overload of a hardware resource and/or a loss of a real-time capability.

Such an analysis makes it possible, in particular, for operation events in the physical world which have a cause originating in the area of the automation software and/or of the data traffic of the automation device to be rapidly recognized and for suitable countermeasures to be enabled. It is conceivable, for example, for excessively high data traffic to give rise to an overload of the hardware involved and thus in turn to a short-term loss of the real-time capability of an automation device during the execution of the automation software. This can then affect the production process. This can give rise for example to fluctuations in the quality of a product, such as a thickness of a film produced, for example. The system described herein can provide for example that, on account of a triggering operation event in the physical world, for example if the fluctuation of the product quality, for example of the film thickness, is recognized by a sensor, an analysis of the automation software and/or of the data traffic is carried out with regard to an information technology cause of the disturbance. The correlation between the occurrence of the quality fluctuations and the increased data traffic can be recognized in the context of such an analysis. The system described herein thus makes it possible to quickly find the cause of the operation event.

The system described herein can provide in particular for the analysis to be effected with regard to relationships between data extracted from operation data obtained using sensors in the physical world and data extracted from the automation software and/or from the data traffic of the automation device.

The analysis of the data includes in particular the analysis of operation data obtained using sensors in the physical world. The analysis in turn is effected in particular with regard to effects of a security-relevant event on the operation of the technical device. In the case of such an analysis, it is possible to recognize a correlation between security-relevant events in the field of information technology and the effects thereof during operation of the technical device. In this regard, for example, an overload attack (so-called "denial of service" attack) on an automation device can be recognized. The attack can be recognized for example by a firewall and/or an intrusion detection system. By analyzing operation data obtained using sensors in the physical world, it is then possible to check for example whether the attack has affected a manufacturing device, in particular the operation of this manufacturing device. Depending on the result of the analysis, it is possible in the short term and purposefully to initiate measures and/or to stop or continue operation, depending on how the effects of the operation event are assessed on the basis of the result of the analysis. In this way, on one hand, it is possible to prevent damage as a result of security-relevant events of the type in question; on the other hand, it is possible to avoid operation interruptions if the analysis can reveal that a security-relevant event did not have direct effects on the operation of the technical device.

The automation device can be in particular a control device of an electrical drive system. Alternatively and/or supplementarily, the technical device can be a technical device that includes an electrical drive system, in particular a machine and/or installation. Electrical drive systems make high demands on control devices of the type in question, particularly as far as the real-time capability is concerned. At the same time, besides purely controlling one drive and/or a plurality of drives, the control devices in question may have to provide a number of additional functionalities, such as enabling remote maintenance accesses via data connections, for example. The underlying software architectures of such automation devices are correspondingly complex in order to be able to satisfy the different requirements in regard to the respective functionalities. However, the electrical drive systems are regularly an elementary part of the technical device, which is why interventions in the software of the automation device are regularly associated with extensive downtimes of the entire technical device. Lengthy fault finding processes therefore have a particularly adverse effect in particular in the case of such automation devices. Therefore, the system described herein that analyzes an operation event is advantageously usable precisely in the case of such automation devices and/or technical devices.

BRIEF DESCRIPTION OF DRAWINGS

Further practical embodiments and advantages of the system described herein are set forth below in association with FIG. 1.

DETAILED DESCRIPTION OF VARIOUS EMBODIMENTS

The system described herein can provide for example that during the carrying out of routine operation symbolized by the method step 10, the technical device is monitored for the occurrence of operation events of specific operation event types. In this case, the monitoring is effected by the analysis software, in particular.

Upon the occurrence of an operation event of an operation event type for whose occurrence the technical device is being monitored, the next method step 12 involves the triggering of the analysis according to that analysis module of the analysis software which is assigned to the operation event type recognized.

The method can provide, as in the example shown, that after the occurrence of the operation event, in a method step 14, the analysis software stores a copy of the operation data obtained using sensors in the physical world, of the automation software and/or of the data traffic of the automation device in a memory area provided therefor.

As described above in another context, in a further method step 16, the data to be evaluated by the analysis software can be extracted from the copy. In this case, the data to be extracted are selected in particular on the basis of the rules for the extraction of the data that are contained in the analysis module.

The method can provide, as in the example shown, for a further method step 18 to involve conditioning of the data, wherein the data are stored in a database. In this case, the structure of the database is established by the analysis software depending on the rules stored in the analysis module used.

In a further method step 20, the actual analysis of the operation event can be effected by the data stored in the database being evaluated with regard to the operation event by the analysis software.

As illustrated by way of example, a further step 22 can involve outputting the result of the analysis of the data, for example in the form of a suitable visualization.

The features of the invention which are disclosed in the present description, the drawing and also in the claims may be essential to the realization of the invention in its various embodiments both individually and in any combinations. The invention is not restricted to the embodiments described. It can be varied within the scope of the claims and taking account of the knowledge of the competent person skilled in the art.

The invention claimed is:

1. A method for analyzing operation events during operation of a technical device, having at least one automation device, the method comprising:

enabling the automation device to execute automation technology tasks using automation software that is executable by the automation device;

analysis software extracting data from operation data obtained using physical world sensors, from the automation software and/or from data traffic of the automation device; and the analysis software conditioning the extracted data, wherein the conditioning includes storing extracted data in a database and the data stored in the database are evaluated with regard to an operation event by the analysis software that includes a plurality of analysis modules for analyzing operation events of specific operation event types, wherein each analysis module is assigned to a specific operation event type and the analysis modules include rules for extraction, conditioning and/or analysis of the data.

2. The method as claimed in claim 1, wherein the rules for the extraction of the data concern selection of data to be extracted.

3. The method as claimed in claim 1, wherein the rules for the conditioning of the data concern a structure of the database.

4. The method as claimed in claim 3, wherein the database is a relational database.

5. The method as claimed in claim 3, wherein the structure of the database is established by the analysis software and depends upon the rules of an analysis module used and a context of the conditioning of the data.

6. The method as claimed in claim 5, wherein the database is a relational database.

7. The method as claimed in claim 1, wherein the analysis software stores a copy of the operation data obtained using the physical world sensors, of the automation software and/or of data traffic of the automation device in a memory area provided therefor and extracts the data from the copy.

8. The method as claimed in claim 7, wherein access to the operation data obtained using the physical world sensors, to the automation software and/or to the data traffic of the automation device is effected by the analysis software using a write blocker.

9. The method as claimed in claim 7, wherein the copy of the operation data obtained using the physical world sensors, of the automation software and/or of the data traffic is protected against changes and/or unrecognized changes which make it possible to recognize a cause of a change to the copy.

10. The method as claimed in claim 9, wherein the copy of the operation data is protected using a hash function and/or an authentication feature.

11. The method as claimed in claim 1, wherein, with respect to data stored in the database, information is stored that indicates an extent to which the data correspond to forensic requirements.

12. The method as claimed in claim 1, wherein a stored copy is a forensic duplicate of a data carrier and/or main memory of the automation device.

13. The method as claimed in claim 12, wherein the stored copy is a forensic duplicate of a hard disk of the automation device and/or a memory card accommodated in the automation device, and/or a data packet from the data traffic of the automation device.

14. The method as claimed in claim 1, wherein an automated triggering of analysis of the operation events is effected upon occurrence of a triggering operation event of a specific operation event type.

15. The method as claimed in claim 14, wherein the operation event type is a triggering operation event corresponding to recognition of a security-relevant event by an information technology security system.

16. The method as claimed in claim 15, wherein the information technology security system is a firewall, an intrusion detection system and/or a virus scanner.

17. The method as claimed in claim 14, wherein the operation event type is a triggering operation event corresponding to recognition of a disturbance of routine operation using the physical world sensors in and/or based on operation data obtained using the physical world sensors.

18. The method as claimed in claim 14, wherein the triggering operation event is effected using an analysis module which is assigned to an operation event type of the triggering operation event.

19. The method as claimed in claim 1, wherein the automation software and/or the data traffic of the automation device are/is analyzed with regard to information technology causes of a disturbance.

20. The method as claimed in claim 19, wherein one of the information technology causes is an overload of a hardware resource and/or a loss of a real-time capability.

21. The method as claimed in claim 1, wherein analysis of the data includes analysis of operation data obtained using the physical world sensors.

22. The method as claimed in claim 21, wherein the analysis of the operation data includes analyzing effects of a security-relevant event recognized by an information technology security system on the operation of the technical device.

23. The method as claimed in claim 2, wherein the automation device is a control device of an electrical drive system and/or the technical device is a technical device that includes an electrical drive system.

24. The method as claimed in claim 1, wherein the analysis software is designed to be expandable by further analysis modules and/or provides tools for generating further analysis modules.

\* \* \* \* \*